United States Patent
Yan et al.

(10) Patent No.: US 12,294,869 B2
(45) Date of Patent: May 6, 2025

(54) CELL SITE ENERGY UTILIZATION MANAGEMENT

(71) Applicant: AT&T Intellectual Property I, L.P., Atlanta, GA (US)

(72) Inventors: He Yan, Berkeley Heights, NJ (US); Ioannis Broustis, Basking Ridge, NJ (US); Slawomir Stawiarski, Carpentersville, IL (US); Xuan Liu, Basking Ridge, NJ (US); Jennifer Yates, Morristown, NJ (US); Zihui Ge, Madison, NJ (US); Sarat Puthenpura, Berkeley Heights, NJ (US); Giritharan Rana, Basking Ridge, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 474 days.

(21) Appl. No.: 17/870,393

(22) Filed: Jul. 21, 2022

(65) Prior Publication Data
US 2024/0031850 A1   Jan. 25, 2024

(51) Int. Cl.
*G06N 3/02*   (2006.01)
*G06N 20/00*   (2019.01)
(Continued)

(52) U.S. Cl.
CPC .............. *H04W 16/22* (2013.01); *G06N 3/02* (2013.01); *G06N 20/00* (2019.01);
(Continued)

(58) Field of Classification Search
CPC ....... G06N 3/02–105; G06N 20/00–20; H04B 17/0082–3913; H04L 41/08–26; H04L 43/02–55; H04W 16/02–32; H04W 24/02–10; H04W 28/02–26; H04W 36/0005–385; H04W 52/02–0206;
(Continued)

(56) References Cited

U.S. PATENT DOCUMENTS

| | | | |
|---|---|---|---|
| 2022/0295393 A1 | 9/2022 | Puthenpura et al. | |
| 2023/0032030 A1* | 2/2023 | Choi | H04W 16/22 |
| 2024/0098566 A1* | 3/2024 | Gemelli | H04W 24/02 |

OTHER PUBLICATIONS

UBS, Insights, "5G coverage vs. capacity", CIP Global Blog, Mar. 4, 2020, 5 pages.
(Continued)

*Primary Examiner* — Timothy J Weidner

(57) ABSTRACT

A processing system may apply a data set comprising utilization metrics of a cells of a cell sector to a throughput prediction model to obtain a first predicted throughput for the cell sector for a designated future time period and for all cells being in an active state. The processing system may generate a first modified data set simulating a first cell being placed in an inactive state, by distributing utilization metrics of the first cell over at least one additional cell, and may apply the first modified data set to the throughput prediction model to obtain a second predicted throughput. The processing system may then determine that the second predicted throughput meets a threshold throughput that is based on the first predicted throughput, and transmit at least one instruction to place the first cell in the inactive state for the designated future time period in response to the determining.

20 Claims, 7 Drawing Sheets

(51) Int. Cl.
| | |
|---|---|
| H04B 17/391 | (2015.01) |
| H04L 41/14 | (2022.01) |
| H04L 41/16 | (2022.01) |
| H04L 43/0888 | (2022.01) |
| H04L 43/16 | (2022.01) |
| H04W 16/22 | (2009.01) |
| H04W 24/02 | (2009.01) |
| H04W 24/08 | (2009.01) |
| H04W 24/10 | (2009.01) |
| H04W 28/08 | (2023.01) |
| H04W 36/00 | (2009.01) |
| H04W 52/02 | (2009.01) |
| H04W 84/02 | (2009.01) |
| H04W 88/08 | (2009.01) |
| H04W 88/12 | (2009.01) |
| H04W 92/02 | (2009.01) |
| H04W 92/12 | (2009.01) |

(52) U.S. Cl.
CPC ..... *H04B 17/3912* (2015.01); *H04B 17/3913* (2015.01); *H04L 41/145* (2013.01); *H04L 41/16* (2013.01); *H04L 43/0888* (2013.01); *H04L 43/16* (2013.01); *H04W 24/02* (2013.01); *H04W 24/08* (2013.01); *H04W 24/10* (2013.01); *H04W 28/0908* (2020.05); *H04W 28/0917* (2020.05); *H04W 28/095* (2020.05); *H04W 28/0983* (2020.05); *H04W 36/0083* (2013.01); *H04W 52/0206* (2013.01); *H04W 84/02* (2013.01); *H04W 88/08* (2013.01); *H04W 88/12* (2013.01); *H04W 92/02* (2013.01); *H04W 92/12* (2013.01); *Y02D 30/70* (2020.08)

(58) Field of Classification Search
CPC ... H04W 76/10–50; H04W 84/005–22; H04W 88/005–188; H04W 92/02–24; Y02D 30/70
See application file for complete search history.

(56) References Cited

OTHER PUBLICATIONS

Ericsson, "T-Mobile pursues a multi-band 5G spectrum strategy", extract from the Ericsson Mobility Report, Jun. 2021, 6 pages.

\* cited by examiner

310

| CELL | RRC | PRB USED | PRB TOTAL | CELL EFFICIENCY | SLEEPING TIME |
|---|---|---|---|---|---|
| CELL A | 4 | 5 | 100 | 8 | 0 |
| CELL B | 5 | 8 | 100 | 8 | 0 |
| CELL C | 10 | 14 | 100 | 12 | 5 |
| CELL D | 6 | 10 | 100 | 12 | 3 |

320

| CELL | RRC | PRB USED | PRB TOTAL | CELL EFFICIENCY | SLEEPING TIME |
|---|---|---|---|---|---|
| CELL A | 12 | 17 | 100 | 8 | 0 |
| CELL B | 13 | 20 | 100 | 8 | 0 |
| CELL C | 0 | 0 | 0 | 0 | 15 |
| CELL D | 0 | 0 | 0 | 0 | 15 |

FIG. 3

CELL SITE ENERGY UTILIZATION MANAGEMENT

The present disclosure relates generally to cellular networks, and more particularly to methods, computer-readable media, and apparatuses for transmitting an instruction to place at least a first cell in an inactive state at a future time period in response to determining via a throughput prediction model that a predicted throughput of a cell sector meets a threshold throughput when the at least the first cell is in the inactive state.

BRIEF DESCRIPTION OF THE DRAWINGS

The present disclosure can be readily understood by considering the following detailed description in conjunction with the accompanying drawings, in which:

FIG. 3 illustrates an example cell utilization metrics set for a cell sector comprising four cells, and a modified cell utilization metrics set, in accordance with the present disclosure;

To facilitate understanding, identical reference numerals have been used, where possible, to designate identical elements that are common to the figures.

DETAILED DESCRIPTION

Figure 1:
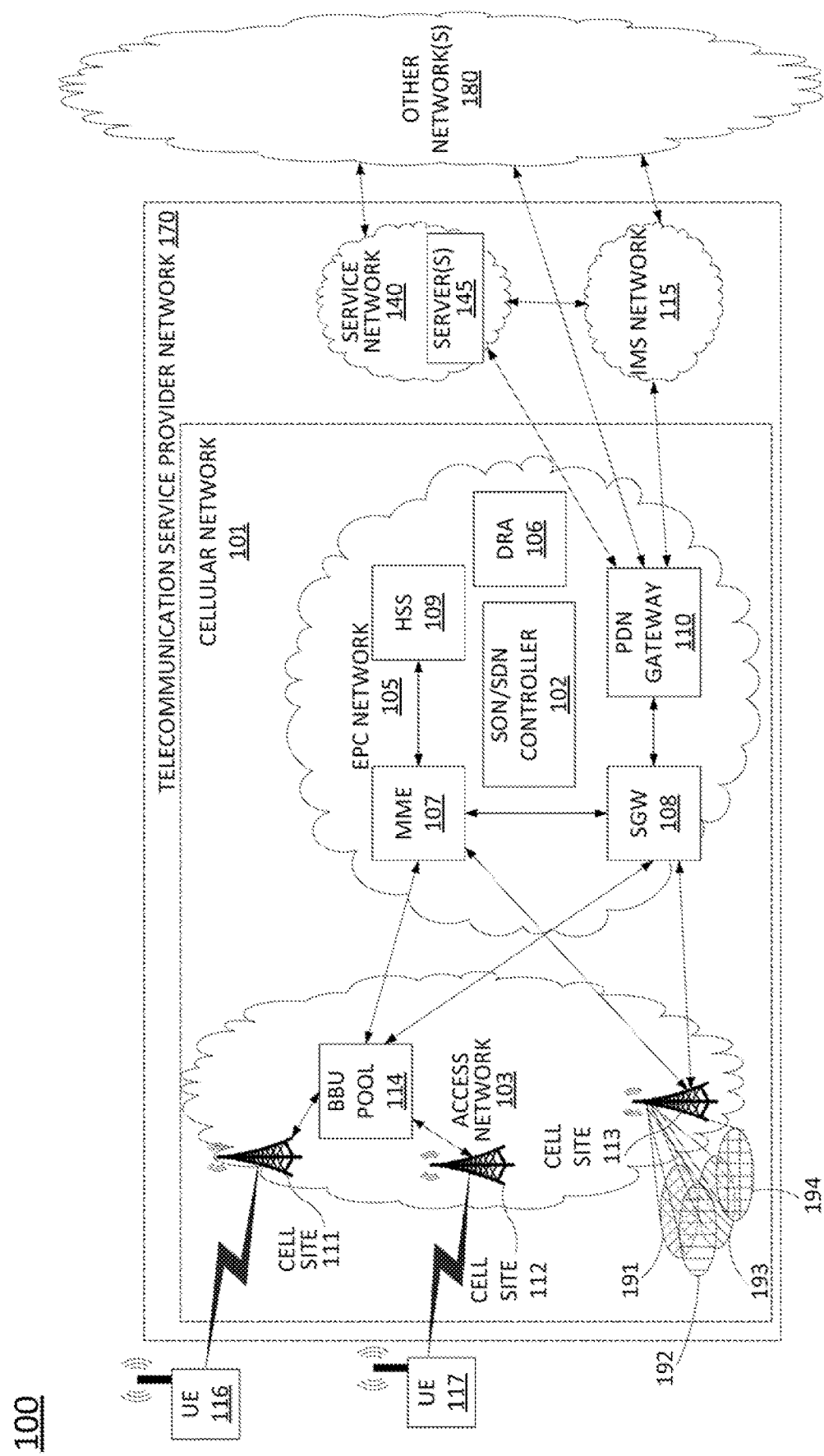
FIG. 1 illustrates an example of a system including a telecommunications service provider network, according to the present disclosure.

Examples of the present disclosure include methods, non-transitory (i.e., tangible and/or physical) computer-readable media, and apparatuses for transmitting an instruction to place at least a first cell in an inactive state at a future time period in response to determining via a throughput prediction model that a predicted throughput of a cell sector meets a threshold throughput when the at least the first cell is in the inactive state. For instance, in one example, a processing system including at least one processor may apply a data set comprising utilization metrics of a plurality of cells of a cell sector to a throughput prediction model to obtain a first predicted throughput for the cell sector for a designated future time period, where the first predicted throughput is for all cells of the plurality of cells being in an active state. The processing system may next modify the data set to generate at least a first modified data set simulating at least a first cell of the plurality of cells being placed in an inactive state, where the modifying comprises distributing utilization metrics of the at least the first cell over at least one additional cell of the plurality of cells, and apply the at least the first modified data set to the throughput prediction model to obtain at least a second predicted throughput. The processing system may then determine that the at least the second predicted throughput meets a threshold throughput, where the threshold throughput is based on the first predicted throughput, and transmit at least one instruction to place the at least the first cell in the inactive state for the designated future time period in response to the determining that the at least the second predicted throughput meets the threshold throughput.

In particular, examples of the present disclosure identify optimal sleep and wakeup parameters (e.g., Radio Resource Control (RRC) utilization-related and physical resource block (PRB) utilization-related) to configure cellular antennas on base-stations to maximize the sleeping time, while minimizing the negative impact on performance from the perspective of endpoint devices (e.g., user downlink (DL) throughput). Drastically different usage patterns may be exhibited for different cell sites and for the same cell site for different times of the day and days of the week. For example, urban cell sites and rural cell sites may have very different usage patterns. Similarly, Tuesday and Saturday afternoons may have very different usage patterns for a same cell site, such as one located at a shopping center. Given the diversity of usage patterns, static sleep and wakeup parameters may generally fail to yield optimal energy savings.

Examples of the present disclosure reduce energy consumption of cell sites of a cellular network (e.g., LTE and 5G cell sites, etc.) without impacting customer experience by configuring cellular antennas, or other cell site equipment (e.g., feed networks, baseband units, etc.) to intelligently sleep and wakeup at the proper times. Specifically, examples of the present disclosure provide a machine learning (ML)-based system to optimize parameters for energy saving on cellular base stations (or "cell sites"). For instance, in one example, the present disclosure may train and deploy a throughput prediction model based on historical data, e.g., a deep neural network (DNN). In addition, the present disclosure may include a simulator that forecasts throughput performance based on different sleep-wake configurations of multiple cells at a cell site (e.g., for a same sector or coverage zone) via the throughput prediction model in order to select an optimized plan. In addition, sleep-wake parameters (e.g., RRC and PRB-related) for different cells may be selected via a parameter optimizer using the results from the simulator. Thus, the present disclosure uses machine learning-based forecasting to automatically optimize energy savings parameters on a per-cell, per-day (and per time-block) basis to maximize sleeping time without impacting user experience.

In one example, the throughput prediction model (e.g., a DNN) may have predictors that include per cell/carrier media access control (MAC) volume, a number of attached endpoint devices (e.g., a number of endpoint device in RRC connected state), a PRB utilization, a PRB total, a cell efficiency, a sleeping time (e.g., a number of minutes in a sleep/idle/inactive state within a given time block), and others. The dependent variable may be a per face/sector throughput (e.g., user DL throughput). In one example, the throughput prediction model may be built based on Keras with Tensorflow backend. In one example, the throughput prediction model may include hyper-parameters of: sequential model, two dense layers with 128 neurons, two drop out layers of 0.5 ratio, Relu activation function, L2 weight regularization factor, Adam optimizer, and mean squared error (MSE) for a loss function.

In one example, the simulator (e.g., a module for modeling hypothetical sleep/wake scenarios) may generate forecasts for a sector/face for a given time block (e.g., time of day and day of the week, such as 1:30-1:45 PM Tuesday, 5:45-6:00 PM Thursday, etc.). In one example, the simulator may enumerate through possible sleeping scenarios (e.g., different combinations of cells of the sector/face being asleep and awake). For instance, the simulator may reversely order scenarios by the number of sleeping cells (e.g., a number of sleeping "capacity cells"). Then, for each scenario, the simulator may call the throughput prediction model to predict the user throughput for each scenario. When both the throughput tradeoff (e.g., 99%, 95%, etc.) and operational thresholds are met, the optimal scenario for the current sector/face and weekday is found. Lastly, a parameter optimizer (e.g., a module for selecting sleep/wake thresholds on a per-cell basis) may translate a selected sleep/wake scenario from the previous step to concrete RRC/PRB parameters, which can be configured into the cellular network.

Thus, examples of the present disclosure employ a machine learning-based optimizer to find sleep/wake parameters to achieve the maximum energy saving without imposing any significant service degradation. For instance, examples of the present disclosure may achieve energy saving of 20 percent or more as compared to existing manual sleep/wake settings. These and other aspects of the present disclosure are discussed in greater detail below in connection with the examples of FIGS. 1-7.

To aid in understanding the present disclosure, FIG. 1 illustrates an example system 100 in which examples of the present disclosure may operate. In one example, the system 100 includes a telecommunication service provider network 170. The telecommunication service provider network 170 may comprise a cellular network 101 (e.g., a 4G/Long Term Evolution (LTE) network, a 4G/5G hybrid network, or the like), a service network 140, and an IP Multimedia Subsystem (IMS) network 115 (or IMS core network). In one example, the cellular network 101 comprises an access network 103 and a core network, Evolved Packet Core (EPC) network 105. The system 100 may further include other networks 180 connected to the telecommunication service provider network 170. FIG. 1 also illustrates various mobile endpoint devices, e.g., user endpoints, or user equipment (UE) 116 and 117. The UEs 116 and 117 may each comprise a cellular telephone, a smartphone, a tablet computing device, a laptop computer, a pair of computing glasses or goggles, a wireless enabled wristwatch, or any other cellular-capable mobile telephony and computing devices (broadly, "a mobile endpoint device"), such as cellular-enabled sensor devices.

In one example, the access network 103 may comprise a cloud RAN. For instance, a cloud RAN is part of the 3rd Generation Partnership Project (3GPP) specifications for mobile networks. As part of the migration of cellular networks towards 5G, a cloud RAN may be coupled to an EPC network until new cellular core networks are deployed in accordance with 5G specifications. In one example, access network 103 may include cell sites 111 and 112 and a baseband unit (BBU) pool 114. In a cloud RAN, radio frequency (RF) components, referred to as remote radio heads (RRHs), may be deployed remotely from baseband units, e.g., atop cell site masts, buildings, and so forth. In one example, the BBU pool 114 may be located at distances as far as 20-80 kilometers or more away from the antennas/remote radio heads of cell sites 111 and 112 that are serviced by the BBU pool 114. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site, may in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 113 may include RRH and BBU components. Thus, cell site 113 may comprise a self-contained "base station." With regard to cell sites 111 and 112, the "base stations" may comprise RRHs at cell sites 111 and 112 coupled with respective baseband units of BBU pool 114. In accordance with the present disclosure, any one or more of cell sites 111-113 may be deployed with antenna and radio infrastructures, including multiple input multiple output (MIMO) and millimeter wave antennas. In one example, any one or more of cell sites 111-113 may comprise one or more directional antennas (e.g., capable of providing a half-power azimuthal beamwidth of 60 degrees or less, 30 degrees or less, 15 degrees or less, etc.). In one example, any one or more of the cell sites 111-113 may comprise a 5G "new radio" (NR) base station.

In addition, any one or more of the cell sites 111-113 may be designed so as to have one or more sectors, such as three sectors covering 120 degrees each in azimuth, two sectors each covering 180 degrees in azimuth, etc. However, it should be noted that a cell site does not necessarily need to provide a full 360 degree coverage, but may provide a lesser coverage, such as two sectors covering 240 degrees in azimuth. In addition, each sector may be associated with one or more cells. For instance, each sector may include respective sets of network equipment to provide services to endpoint devices in respective cells. The cells may have the same coverage/footprints, or may have different footprints. Typically, these will be arranged so as to be fully or mostly overlapping. However, in some cases, it may be desirable to have partially offset footprints, e.g., to increase the likelihood that UEs at a sector edge may receive strong signals from the base station antenna(s). In addition, the cells may be associated with different frequency bands, and hence it may be challenging to provide identical coverage/footprints due to different physical effects, such as dispersion, interference, etc., even where it is desired to have the same footprints.

In one example, each cell may have its own respective antenna array (not shown), feed network (not shown), baseband unit(s), etc. For instance, the antenna array(s) and feed network(s) may be deployed at cell sites 111-113, while the baseband unit(s) may be deployed at cell sites 111-113 and/or within BBU pool 114. Alternatively, or in addition, some cells may share one or more network equipment items. For instance, two cells may share an antenna array but may have different feed networks, may share an antenna array and feed network, but may have different baseband units, and so forth. As illustrated in FIG. 1, cell site 113 may comprise equipment that is capable of and that is configured to provide four cells 191-194. For purposes of illustration in FIG. 1, the four cells 191-194 are shown as partially overlapping. However, as noted above, the actual cell patterns for cells 191-194 may vary. In addition, for purposes of describing aspects of the present disclosure, there are no specific requirements for the cell footprints and the relation of the footprints to each other. In one example, cells 191-194 may be for one of a plurality of sectors of cell site 113. For instance, cell site 113 may have three sectors, each of which may have four cells. For ease of illustration, cells 191-194 for only a single sector of cell site 113 are shown in FIG. 1. It should also be noted that in accordance with the present disclosure, and as described in greater detail below, cells may be of one of two types: coverage cells or capacity cells.

In one example, the EPC network 105 provides various functions that support wireless services in the LTE environment. In one example, EPC network 105 is an Internet Protocol (IP) packet core network that supports both real-time and non-real-time service delivery across a LTE network, e.g., as specified by the 3GPP standards. In one example, cell sites 111 and 112 in the access network 103 are in communication with the EPC network 105 via baseband units in BBU pool 114. In operation, UE 116 may access wireless services via the cell site 111 and UE 117 may access wireless services via the cell site 112 located in the access network 103. It should be noted that any number of cell sites can be deployed in access network. In one illustrative example, the access network 103 may comprise one or more cell sites.

In EPC network 105, network devices such as Mobility Management Entity (MME) 107 and Serving Gateway (SGW) 108 support various functions as part of the cellular network 101. For example, MME 107 is the control node for the LTE access network. In one embodiment, MME 107 is responsible for UE (user equipment) tracking and paging (e.g., such as retransmissions), bearer activation and deactivation process, selection of the SGW, and authentication of a user. In one example, SGW 108 routes and forwards user data packets, while also acting as the mobility anchor for the user plane during inter-cell handovers and as the anchor for mobility between 5G, LTE and other wireless technologies, such as 2G and 3G wireless networks.

In addition, EPC network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a packet data network (PDN) gateway 110 which serves as a gateway that provides access between the EPC network 105 and various data networks, e.g., service network 140, IMS core network 115, other network(s) 180, and the like. The packet data network gateway 110 is also referred to as a PDN gateway, a PDN GW or a PGW. In addition, the EPC network 105 may include a Diameter Routing Agent (DRA) 106, which may be engaged in the proper routing of messages between other elements within EPC network 105, and with other components of the system 100, such as a call session control function (CSCF) (not shown) in IMS core network 115. For clarity, the connections between DRA 106 and other components of EPC network 105 are omitted from the illustration of FIG. 1.

In one example, service network 140 may comprise one or more devices, such as server(s) 145 for providing services to subscribers, customers, and or users. For example, telecommunication service provider network 170 may provide a cloud storage service, web server hosting, and other services. As such, service network 140 may represent aspects of telecommunication service provider network 170 where infrastructure for supporting such services may be deployed. Although a single server 145 is illustrated in service network 140, it should be understood that service network 140 may include any number of servers and other components to support one or more services that may be provided to one or more subscribers, customers, or users by the telecommunication service provider network 170.

Figure 7:
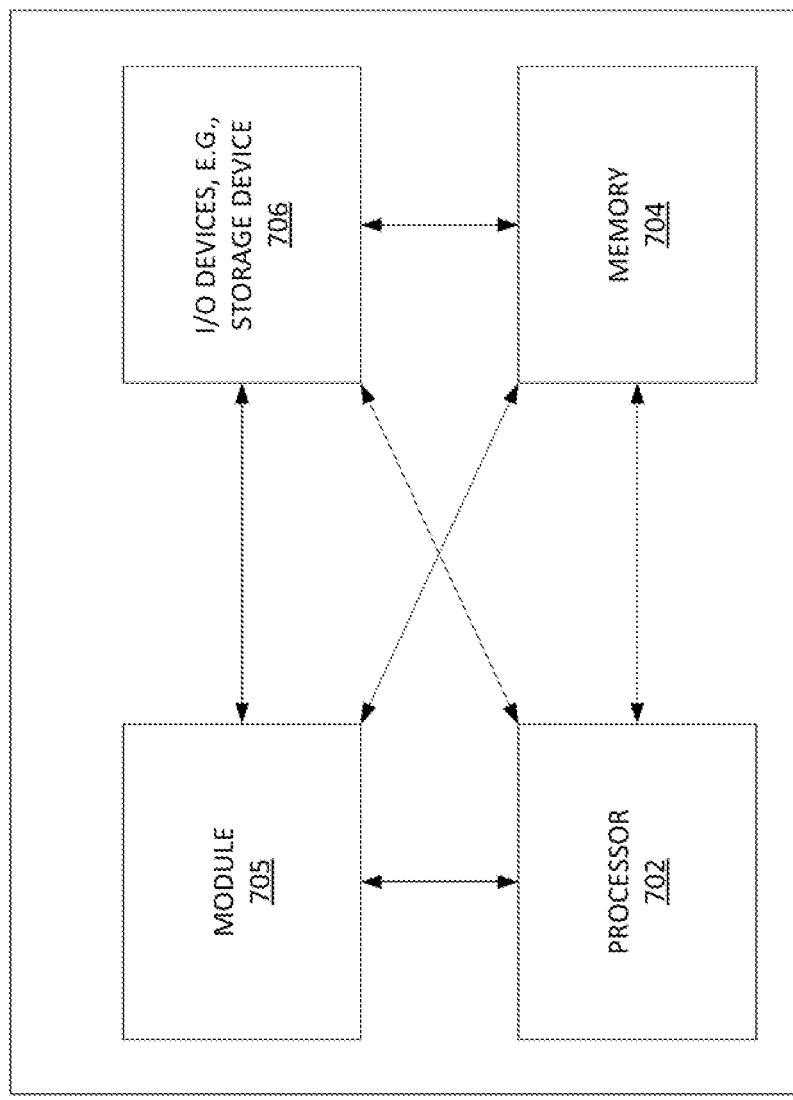
FIG. 7 illustrates a high-level block diagram of a computing device specifically programmed to perform the functions described herein.

In one example, each of the server(s) 145 may comprise programs, logic, or instructions for performing functions in connection with examples of the present disclosure for transmitting an instruction to place at least a first cell in an inactive state at a future time period in response to determining via a throughput prediction model that a predicted throughput of a cell sector meets a threshold throughput when the at least the first cell is in the inactive state. For example, server(s) 145 may comprise a computing system or device, such as computing system 700 depicted in FIG. 7, or multiple instances of such computing system or device, and may individually or collectively be configured to provide one or more operations or functions in connection with the example method 600, as described herein. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 7 and discussed below, and which may include central processing units (CPUs), graphics processing units (GPUs), programmable logic devices (PLDs), and so forth) or multiple computing devices collectively configured to perform various steps, functions, and/or operations in accordance with the present disclosure.

In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general.

In accordance with the present disclosure, any one or more of the components of EPC network 105 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 107 may comprise a vMME, SGW 108 may comprise a vSGW, and so forth. In this regard, the EPC network 105 may be expanded (or contracted) to include more or less components than the state of EPC network 105 that is illustrated in FIG. 1. In this regard, the EPC network 105 may also include a self-optimizing network (SON)/software defined network (SDN) controller 102.

In one example, SON/SDN controller 102 may function as a self-optimizing network (SON) orchestrator that is responsible for activating and deactivating, allocating and deallocating, and otherwise managing a variety of network components. In one example, SON/SDN controller 102 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places.

In addition, in one example, SON/SDN controller 102 may represent a processing system comprising a plurality of controllers, e.g., a multi-layer SDN controller, one or more federated layer 0/physical layer SDN controllers, and so forth. For instance, a multi-layer SDN controller may be responsible for instantiating, tearing down, configuring, reconfiguring, and/or managing layer 2 and/or layer 3 VNFs (e.g., a network switch, a layer 3 switch and/or a router, etc.). One or more layer 0 SDN controllers may be responsible for activating and deactivating optical networking components, for configuring and reconfiguring the optical networking components (e.g., to provide circuits/wavelength connections between various nodes or to be placed in idle mode), for receiving management and configuration information from such devices, and so forth. One or more layer SDN controllers may also be responsible for activating and deactivating cellular network hardware components (e.g., providing sleep/wake instructions), for configuring and reconfiguring the cellular network hardware components (e.g., with RRC and/or PRB utilization thresholds for activating/deactivating components), for receiving management and configuration information from such devices, and so forth. In one example, the layer 0 SDN controller(s) may in turn be controlled by the multi-layer SDN controller. For instance, each layer 0 SDN controller may be assigned to nodes/optical components within a portion of the network EPC network 105, cellular network 101, and/or telecommunication service provider network 170. In addition, these various components may be co-located or distributed among a plurality of different dedicated computing devices or shared computing devices (e.g., NFVI) as described herein.

In one example, SON/SDN controller 102 may comprise programs, logic, or instructions for performing functions in connection with examples of the present disclosure for transmitting an instruction to place at least a first cell in an inactive state at a future time period in response to determining via a throughput prediction model that a predicted throughput of a cell sector meets a threshold throughput when the at least the first cell is in the inactive state. For example, SON/SDN controller 102 may comprise a computing system or device, such as computing system 700 depicted in FIG. 7, or multiple instances of such computing system or device, and may individually or collectively be configured to provide one or more operations or functions in connection with the example method 600, as described herein.

In an illustrative example, server(s) 145 may receive and store network operational data. In connection with the present disclosure, the network operational data may be cell specific, and may include per-cell media access control MAC volume, a number of attached endpoint devices (e.g., a number of endpoint devices/UEs in RRC connected state), a PRB utilization, a PRB total, a cell efficiency, a sleeping time (e.g., a number of minutes in a sleep/idle/inactive state within a given time block), and so forth. The network operational data may be collected from various network components/network equipment, such as cell site 113, BBU pool 114, MME 107, SGW 108, and so forth. For instance, the network operational data may comprise or may be derived from call detail records (CDRs) generated within EPC network 105, e.g., by one or more of the SGW 108, PDN gateway 110, and/or other component(s). However, in accordance with the present disclosure, access network 103 may also generate radio access network (RAN) utilization records that specifically record aspects of the usage of access network 103 by UEs 116 and 117 (and similarly for other UEs that attach to access network 103). In particular, BBU pool 114 (and/or a BBU of cell site 113) may generate RAN utilization records that may contain the abovementioned network operational data, and which may alternatively or additional include UE identifiers, quality class indicators (QCIs), and so forth.

In one example, server(s) 145 may train a throughput prediction model (e.g., for a cell site sector comprising a number of cells) based upon the network operational data, e.g., RAN utilization data including at least RRC and PRB utilization metrics for each cell, and in one or more additional examples, further including, for each cell: MAC volume metrics, cell efficiency metrics (e.g., spectral efficiency), measures of sleeping time within a given time block (e.g., number of sleeping minutes within a 15 minute time block), and so forth. Other cell level performance indicators may be used as additional predictors, such as historic throughput, e.g., historic uplink and/or downlink volume/throughput, video user downlink throughput (video specific), harmonic UE throughput, throughput gap (difference between maximum and minimum UE throughputs), worst throughput, cluster harmonic throughput, a weighted sum of the foregoing, etc., radio frequency (RF) conditions, control channel element (CCE) utilization, active UEs, neighbor relations, handovers, frequency, bandwidth, user geographic distribution, reference signal received power (RSRP), reference signal received quality (RSRQ), and/or channel quality information (CQI) distribution, timing advance (TA) distribution, cell bitrate, and so forth.

In one example, the throughput prediction model may comprise a machine learning model (MLM) e.g., a trained machine learning algorithm (MLA), such as a reinforcement learning (RL) algorithm (e.g., a deep neural network (DNN), or the like which take at least the cell utilization metrics (e.g., cell-specific RAN utilization metrics) as described herein as inputs, and which generates an output comprising a predicted throughput for a future time period for a cell sector. In one example, the predictors may comprise cell utilization metrics from prior instances of a same time period of a week (e.g., to predict the throughput for 4:15-4:30 PM for a next upcoming Monday, the input predictors may comprise the cell utilization metrics from a prior four Mondays at the same 4:15-4:30 PM time slot (for instance, the immediately prior four Mondays).

In addition, using such a trained throughput prediction model, server(s) 145 may forecast throughputs for the cell site sector for the future time period and for a number of sleep/wake scenarios (e.g., different combinations of cells being asleep/awake). Server(s) 145 may then select one of the scenarios that meets a throughput threshold (and in one example, which also meets other operational thresholds, or other requirements). In addition, in one example, server(s) 145 may generate and transmit one or more instructions to configure network components to implement the selected sleep/wake scenario. In one example, server(s) 145 may also select RRC and PRB sleep and wake thresholds for different cells in accordance with the selected sleep/wake scenario and the different capabilities and operational thresholds or other constraints of the available cells. In one example, the RRC and PRB sleep and wake thresholds may also be included in the one or more instructions. In one example, the instruction(s) may be transmitted to SON/SDN controller 102, which in turn may instruct one or more network components to implement the selected sleep/wake scenario. For instance, in an example relating to a sector of cell site 113, SON/SDN controller 102 may send instruction(s) to cell site 113 (e.g., for one or more baseband units, for one or more feed networks, for one or more antenna arrays, etc. relating to any one or more of cells 191-194).

The foregoing description of the system 100 is provided as an illustrative example only. In other words, the example of system 100 is merely illustrative of one network configuration that is suitable for implementing examples of the present disclosure. As such, other logical and/or physical arrangements for the system 100 may be implemented in accordance with the present disclosure. In one example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For instance, in one example, SON/SDN controller 102 may be spilt into separate components to operate as a SON orchestrator and a SDN controller, respectively. Similarly, although the SON/SDN controller 102 is illustrated as a component of EPC network 105, in another example SON/SDN controller 102, and/or other network components may be deployed in an IMS core network 115 instead of being deployed within the EPC network 105, or in other portions of system 100 that are not shown, while providing essentially the same functionality. Similarly, in one example, BBUs of BBU pool 114 may comprise two or more physically separated components. For instance, a BBU may be split into two components: a central unit (CU) and a distributed unit (DU). In one example, functions of different components may be combined into a single device, or into a lesser number of devices than as shown in FIG. 1. For instance, aspects described above with respect to server(s) 145 may be performed by SON/SDN controller 102, by edge cloud components (e.g., server(s), NFVI, etc. deployed within access network 103 (not shown)), and/or by a base station, such as an eNodeB, and/or any one or more components thereof (e.g., cell site 113, BBU pool 114, or the like).

In addition, although aspects of the present disclosure have been discussed above in the context of a long term evolution (LTE)-based core network (e.g., EPC network 105), examples of the present disclosure are not so limited. For example, as illustrated in FIG. 1, the cellular network 101 may represent a "non-stand alone" (NSA) mode architecture where 5G radio access network components, such as a "new radio" (NR), "gNodeB" (or "gNB"), and so forth are supported by a 4G/LTE core network (e.g., a Evolved Packet Core (EPC) network 105). However, in another example, system 100 may instead comprise a 5G "standalone" (SA) mode point-to-point or service-based architecture where components and functions of EPC network 105 are replaced by a 5G core network, which may include an access and mobility management function (AMF), a user plane function (UPF), a session management function (SMF), a policy control function (PCF), a unified data management function (UDM), an authentication server function (AUSF), an application function (AF), a network repository function (NRF), and so on. In addition, any one or more of cell sites 111-113 may comprise 2G, 3G, 4G and/or LTE radios, e.g., in addition to 5G new radio (NR) functionality (or in accordance with any other future new radio standards). For instance, in non-standalone (NSA) mode architecture, LTE radio equipment may continue to be used for cell signaling and management communications, while user data may rely upon a 5G new radio (NR), including millimeter wave communications, for example. Thus, these and other modifications are all contemplated within the scope of the present disclosure.

Figure 2:
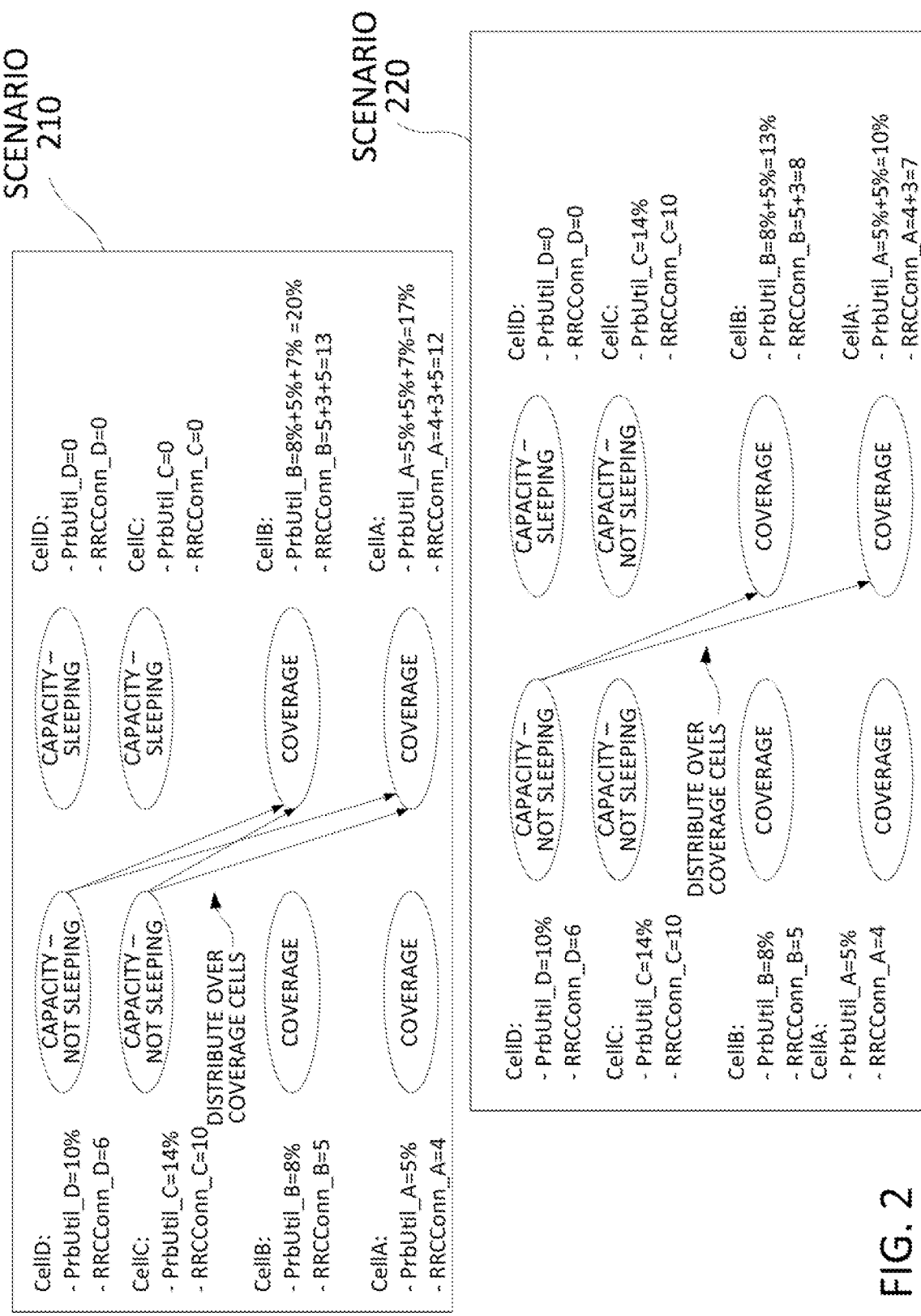
FIG. 2 illustrates two example sleep/wake scenarios for a cell sector with four cells, in accordance with the present disclosure.

To further aid in understanding the present disclosure, FIG. 2 illustrates two example sleep/wake scenarios 210 and 220 for a cell sector with four cells A-D. In accordance with the present disclosure, cells may have two general types: coverage cells and capacity cells. For example, a coverage cell may be configured to have, among other things, a greater range and/or greater in-building penetration. On the other hand a capacity cell may be configured to provide high data rates and/or to serve a larger number of endpoint devices, but may have less range and/or in-building penetration as compared to a coverage cell. For instance, a coverage cell may operate in a low-band (e.g., sub-1 GHz) while a capacity cell may operate in a mid-band (e.g., 1-6 GHz) or high-band (e.g., above 6 GHz). Alternatively, a coverage cell may operate in a mid-band while a capacity cell may operate in a high-band. In still another example, a capacity cell and a coverage cell may operate in a same frequency range or may use different non-overlapping frequency ranges in the same band (e.g., different mid-band frequency ranges). In any case, in accordance with the present disclosure, different cells may be designated as either a capacity cell or a coverage cell. In addition, coverage cells may be designated to remain in an always-on, active state (e.g., always "awake"), while capacity cells are candidates for being placed in an idle, inactive, and/or power-off state (e.g., "asleep").

In the examples of FIG. 2, cells A and B are coverage cells, while cells C and D are capacity cells. The first scenario 210 illustrates an example in which both capacity cells may be placed asleep. Initially, the physical resource block (PRB) utilization percentages and radio resource control (RRC) connection measures (e.g., a number of endpoint devices in RRC connected state) for all cells being awake may be considered (e.g., PrbUtil_A through PrbUtil_D and RRCCon_A through RRCCon_D). In one example, when considering placing cells C and D asleep, the utilization metrics of cells C and D may be distributed over the remaining coverage cells A and B. For instance, if cells C and D were placed asleep, it is assumed that the network demand fulfilled by these cells would not disappear, but instead would be fulfilled by the coverage cells A and B. Thus, as illustrated in FIG. 2, the PRB utilization for cell A increases from 5% to 17% (with an additional 5% coming from the demand for cell D (½ of the PRB utilization demand of cell D) and an additional 7% coming from the demand for cell C (½ of the PRB utilization demand of cell C)). Similarly, the PRB utilization for cell B increases from 8% to 20% (with an additional 5% coming from the demand for cell D (½ of the PRB utilization demand of cell D) and an additional 7% coming from the demand for cell C (½ of the PRB utilization demand of cell C)). A similar distribution of RRC connection demand is also distributed from cells C and D equally over cells A and B. The utilization metrics of cells C and D are set to zero. In the second example scenario 220, only cell D is placed asleep. The utilization metrics of cell D are thus distributed equally over the coverage cells A and B. The utilization metrics of cell C remain its own, while those of cell D are set to zero.

To further aid in understanding the present disclosure, FIG. 3 illustrates an example cell utilization metrics set 310 for a cell sector comprising cells A-D. As noted above, these utilization metrics may be used as predictors to train a throughput prediction model (e.g., a machine learning model (MLM), or machine learning (ML)-based model). In addition, these utilization metrics may comprise inputs to a trained prediction model to generate an output of a predicted/forecast throughput for a future time period. As further noted above, in one example, the predictors (independent variables) of the throughput prediction model may be historical utilization metrics for a same time period of the week for which the forecast/prediction is to be made. In this case, the predictors may be utilization metrics for the cells of the cell sector for the prior four instances of the time period. For instance, to predict the throughput for 4:15-4:30 PM for a next upcoming Monday, the input predictors may comprise the cell utilization metrics from a prior four Mondays at the same 4:15-4:30 PM time slot (e.g., the immediately prior four Mondays).

Accordingly, to train the throughput prediction model, a plurality of training examples may be extracted comprising multiple groups of cell utilization metric sets of prior occurrences of a weekly time block. For instance, in an example in which historical data from four prior instances of a time block is to be used as predictors, a first training example may comprise a group of four cell utilization metrics sets, such as cell utilization metrics set 310, plus three others. In addition, a second training example may comprise a group of another four utilization metrics sets for a different four prior instances of a time block, and so forth. For purposes of training the throughput prediction model, the training examples may have associated throughputs that are known, e.g., have been measured/recorded. In deployment, in one illustrative example only the historical utilization metrics for prior instances of a weekly time block may be known. The throughput is then predicted for the next upcoming instance of the same weekly time block. It should be noted that cell utilization metrics set 320 is described in greater detail below in connection with using a trained throughput prediction model.

As noted above, in one example, the throughput prediction model may comprise a DNN built based on Keras with Tensorflow backend. In one example, the throughput prediction model may include hyper-parameters of: sequential model, two dense layers with 128 neurons, two drop out layers of 0.5 ratio, Relu activation function, 0.001 L2 weight regularization factor, Adam optimizer, mean squared error (MSE) for a loss function, batch size of 600, and with 20 epochs. However, it should be noted that the foregoing is provided by way of example only. Thus, it should be understood that in other, further, and different examples, a different MLM may be deployed, different hyper-parameters may be used, different predictors may be used, more or less sets of historical data may be used as predictors, and so forth.

It should also be noted that as referred to herein, a machine learning model (MLM) (or machine learning-based model) may comprise a machine learning algorithm (MLA) that has been "trained" or configured in accordance with input training data to perform a particular service, e.g., to predict/forecast throughput of a cell sector/coverage zone. For instance, in accordance with the present disclosure, an MLA (or a trained MLM) may comprise a deep learning neural network, or deep neural network (DNN), such as convolutional neural network (CNN), a generative adversarial network (GAN), or the like. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs, or other prediction/forecasting models may be implemented in examples of the present disclosure such as a gradient boosted decision tree (GBDT), k-means clustering and/or k-nearest neighbor (KNN) predictive models, a recurrent neural network (RNN), a long-short term memory (LSTM) neural network, or the like, and so forth.

Figure 4:
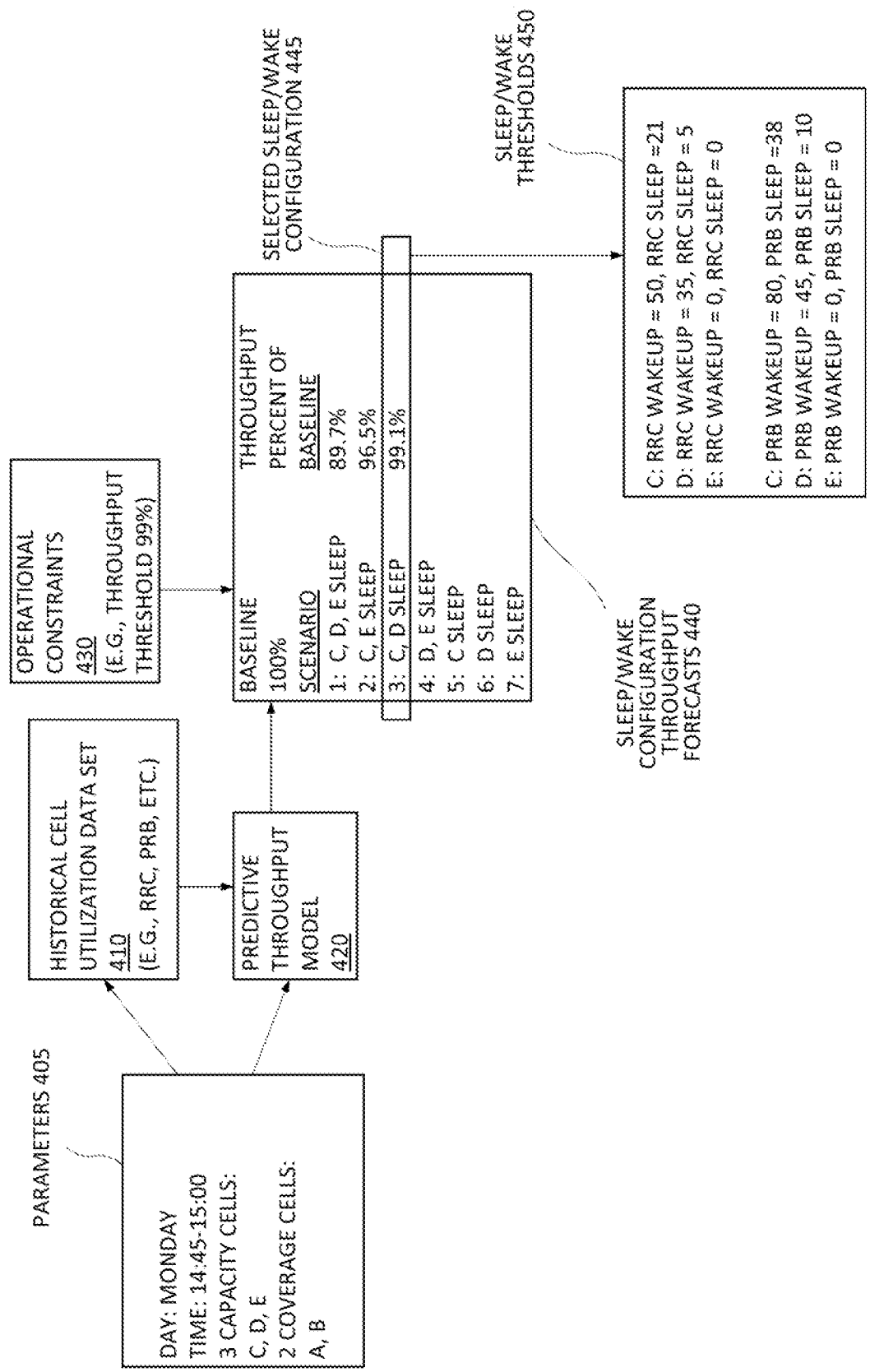
FIG. 4 illustrates an example process of selecting a sleep/wake scenario for a cell sector, in accordance with the present disclosure.

To further aid in understanding the present disclosure, FIG. 4 illustrates an example process 400 of selecting a sleep/wake scenario for a cell sector, in accordance with the present disclosure. In one example, the process 400 may be implemented by one or more components of FIG. 1, such as server(s) 145, server(s) 145 in conjunction with SON/SDN controller 102, cell sites 111-113, BBU pool 114, etc. The process 400 may begin with obtaining parameters 405. For instance, parameters 405 may specify the cell sector, the available cells (e.g., in this case, there are five cells A-E), the cell types (e.g., coverage or capacity) and the time block for which a prediction is to be made (e.g., Monday 2:45-3:00 PM). The parameters 405 may be used to retrieve corresponding historical cell utilization data from historical cell utilization data set 410 for input to a throughput prediction model 420. The throughput prediction model 420 may also be selected in accordance with the parameters 405. For instance, the throughput prediction model 420 may be one of a plurality of throughput prediction models available for different cell sectors of the same or a different cell. The throughput prediction model 420 may be trained as noted above. In one example, the throughput prediction model 420 may be trained via a first network component, and may be deployed for operation in a different network component (e.g., different ones of server(s) 145, or training may be via server(s) 145 and deployment may be within EPC network 105).

The selected historical cell utilization data (e.g., from the previous four weeks of the same time block of Monday 2:45-3:00 PM) may be input to the throughput prediction model 420. In one example, the historical cell utilization data may be for all five cells A-E being active. The output may be a baseline throughput (e.g., in MB/s, or other measures of data volume per unit time). For illustrative purposes, the baseline is indicated in FIG. 4 as simply 100%, rather than a specific value. Next, the throughput prediction model 420 may be used to generate a series of sleep/wake configuration throughput forecasts 440 for different sleep/wake configurations/scenarios for the cell site (e.g., a "what-if" simulator). For example, the present disclosure may enumerate through possible sleep/wake scenarios. In one example, the possible sleep/wake scenarios may be processed in a reverse order organized by the number of sleeping capacity cells. In this case, there are 7 possible sleep/wake scenarios (since only the three capacity cells are candidates to be put to sleep, combinations of one or more of these capacity cells are considered).

To simulate these scenarios, the historical cell utilization data may be modified by distributing utilization metrics of potential sleeping cells over additional cells (or other cells) of the sector. For instance, referring again to FIG. 3, the cell utilization metrics set 310 may comprise the initial data that is input to the throughput prediction model 420 to obtain the baseline throughput as the output. The cell utilization metrics set 320 may comprise the cell utilization metrics set 310 that is modified to distribute the utilization metrics of cells C and D over the coverage cells A and B. In other words, cell utilization metrics set 320 simulates cells C and D being asleep (e.g., scenario 3). Different modified cell utilization metrics sets may be similarly generated from the cell utilization metrics set 310 to simulate other sleep/wake scenarios, which may also be input to the throughput prediction model 420 to obtain different sleep/wake configuration throughput forecasts 440.

In one example, throughput forecasts for various sleep/wake scenarios may be evaluated against one or more operational constraints 430, which may include at least a throughput threshold (e.g., in this case 99%). For instance, an acceptable sleep/wake scenario should provide at least 99% of the baseline throughput. In this case, predicted/forecast throughputs for scenarios 1 and 2 may be obtained, but may be determined to fall short of the threshold. When the throughput threshold is met, an optimal sleep/wake scenario is found. In this case, scenario 3 may have a predicted/forecast throughput of 99.1%, which exceeds the threshold and is thus an acceptable scenario. In one example, the process 400 may skip operations with respect to additional sleep/wake scenarios for which predicted throughputs have not been obtained (e.g., scenarios 4, 5, 6, 7). It should be noted that scenarios 2-4 all comprise two capacity cells being placed to sleep. However, in addition to reverse ordering the scenarios by number of sleeping cells, the present disclosure may sub-order the various scenarios based on increasing cell identifier, decreasing cell identifier, or other ordering. For instance, a network operator may manually tag cell C as being the first choice for sleeping. Thus, the scenarios comprising two sleeping cells (e.g., scenarios 2-4) may be ordered such that combinations that include cell C are evaluated first, and similarly with respect to scenarios in which individual sleeping cells are considered (e.g., scenarios 5-7).

In one example, the identified scenario with acceptable throughput (in this case scenario 3), may also be verified against one or more additional operational constraints 430. For instance, each cell may have a maximum number of endpoint devices that can be simultaneously connected to the network via the cell (e.g., a maximum number of UEs in RRC connected state). If some cells are to be placed asleep and the anticipated demand from such cells is to be redistributed over coverage cells of a sector, even if the sector throughput is deemed adequate, it may still be verified whether the coverage cells' maximum endpoint device loads are not exceeded. A similar consideration may apply to other operational thresholds (e.g., not to exceed a PRB total for a cell, or the like). For illustrative purposes, it may be assumed that scenario 3 complies with any such additional threshold(s). Thus, scenario 3 may comprise the selected sleep/wake configuration 445. Lastly, sleep/wake thresholds 450 may be determined for the selected sleep/wake configuration 445 (e.g., scenario 3). Notably, the sleep/wake thresholds for cell E are set to zero. In other words, cell E is set to remain awake in accordance with the selected sleep/wake configuration 445 (e.g., scenario 3). The thresholds for cells C and D may be set in accordance with a selection process.

In this regard, it should be noted that although cells C and D are selected for being placed asleep (e.g., inactivated) based upon the anticipated throughput, the actual traffic and network demand for the sector from endpoint devices during the time period in question (e.g., Monday 2:45-3:00 PM) may be higher than forecast. As such, wake thresholds may still be set for cells C and D such that cell C and/or cell D may still be activated in real-time if circumstances are different than the forecast. Corresponding sleep thresholds may also be set for implementation if the actual traffic subsides.

Figure 5:
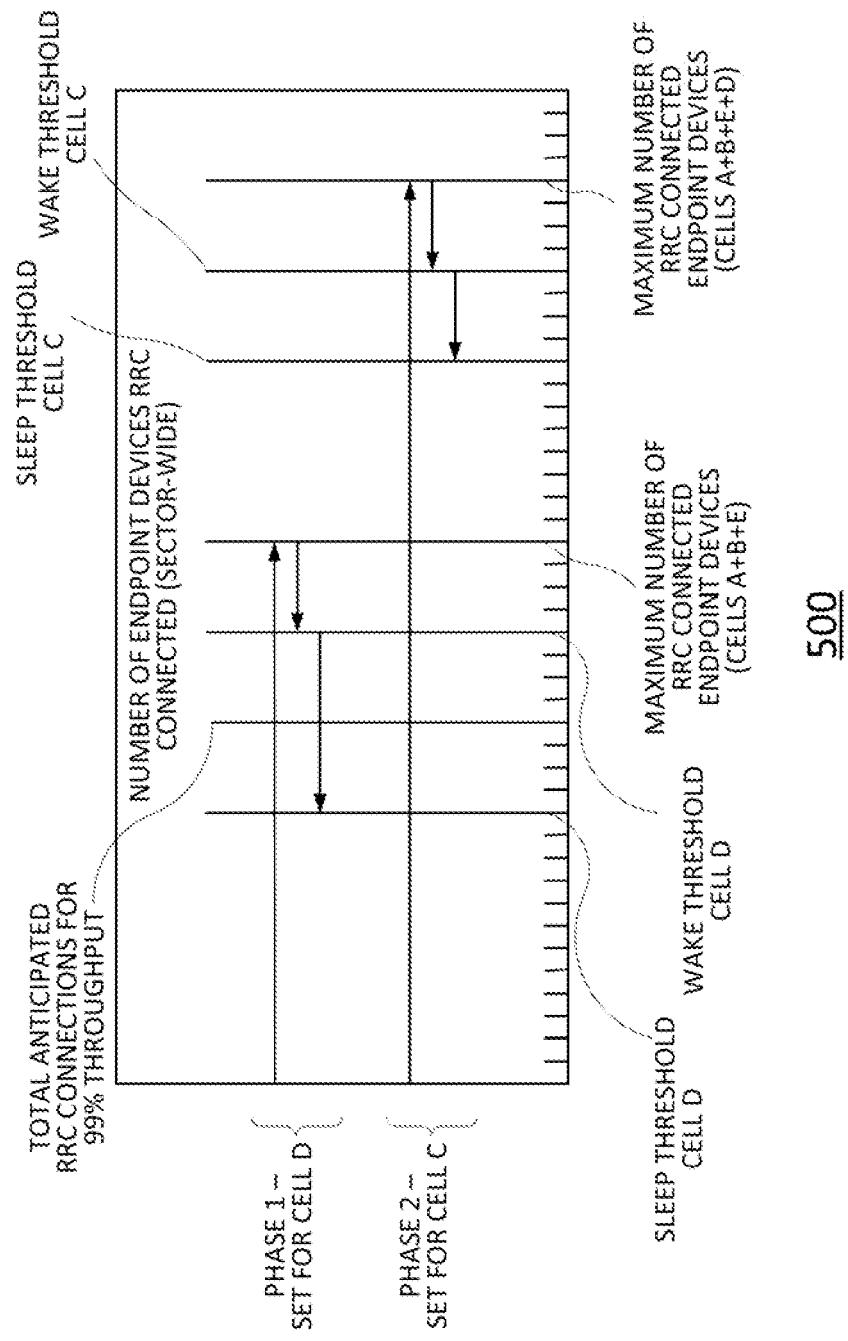
FIG. 5 illustrates an example graph for visualizing an example sleep/wake threshold selection process, in accordance with the present disclosure.

In this regard, FIG. 5 illustrates an example graph 500 for visualizing an RRC connected sleep/wake threshold selection process. In the present example, cell C may be favored for remaining asleep over cell D. As such, a lower wake threshold may first be set for cell D in phase 1. A wake threshold for cell C may then be set in consideration of the possibility of cell D being active in phase 2. To illustrate, in one example, the present disclosure may first determine the maximum number of RRC connected endpoint devices that may be handled concurrently by cells A, B, and E (e.g., the two coverage cells, and one capacity cell that is designated to remain awake). For instance, each cell may have a maximum capacity that may be defined by an equipment manufacturer, a network operator, or other. The wake threshold for cell D may then be set to a lesser value than the maximum number of RRC connected endpoint devices that may be handled concurrently by cells A, B, and E. In one example, the wake threshold for cell D may also be selected so as to be a larger value than the total anticipated RRC connections for the cell sector at 99% throughput. For instance, from the historical cell utilization data, the processing system may determine a forecast RRC connection demand for cells A, B, and E (with cells C and D being asleep). For instance, the present disclosure may consider four sets of historical cell utilization data. For each set, the total number of RRC connections for all cells may be summed. The totals may then be averaged to give the forecast number of RRC connections at the subject time period (e.g., Monday 2:45-3:00 PM). Notably, in one example, it may be assumed that the total RRC connection capacity of cells A, B, and E exceeds the forecast RRC connection demand insofar as the process 400 of FIG. 4 is specifically configured to find a sleep/wake configuration that will meet the throughput threshold, and in one example, to meet other operational constraints 430, such as an RRC connection constraint. In one example, the wake threshold for cell D may be set at a fixed offset from the maximum number of RRC connected endpoint devices that may be handled concurrently by cells A, B, and E, a percentage based offset, or the like. Alternatively, or in addition, the wake threshold for cell D may be set at a fixed offset from the forecast RRC connection demand, a percentage based offset, or the like.

Having selected the wake threshold for cell D, the sleep threshold for cell D may then be selected to be a lower value than the wake threshold. In one example, the sleep threshold for cell D may be set at a fixed offset from the wake threshold for cell D, a percentage based offset, or the like. In one example, the sleep threshold may also be set to a lesser value than the forecast RRC connection demand, a percentage based offset, or the like. Next, in phase 2, similar thresholds may be selected for cell C. In one example, the maximum number of RRC connected endpoint devices that may be handled concurrently by cells A, B, D, and E may be determined in a similar manner as described above. Then, the wake threshold for cell C may be set at a fixed offset from the maximum number of RRC connected endpoint devices that may be handled concurrently by cells A, B, D, and E, a percentage based offset, or the like. In addition, the sleep threshold for cell C may be set (to a lesser value) at a fixed offset, a percentage based offset, or the like with respect to the wake threshold for cell C (and/or with respect to the maximum number of RRC connected endpoint devices that may be handled concurrently by cells A, B, D, and E).

It should be noted that the same or a similar process may be followed to select corresponding PRB utilization sleep/wake thresholds for cells C and D. In addition, when these thresholds are selected, instructions may be sent to one or more network elements in order to implement the selected sleep/wake configuration 445 and/or to load the corresponding sleep/wake thresholds 450 illustrated in FIG. 4. It should also be noted that foregoing describes just one example for a sector comprising two coverage cells and three capacity cells, and that other, further, and different examples may relate to sectors with more or less cells, different combinations of cells (e.g., different number of capacity cells and/or coverage cells), and so forth. Similarly, although the foregoing is described in connection with the use of four sets of historical data for the relevant time block, other, further, and different examples may use more or less sets of historical data as predictors for the throughput prediction model, more or less sets of historical data for calculating a total anticipated number of RRC connections and/or total anticipated PRB utilization, and so forth. Thus, these and other modifications are all contemplated within the scope of the present disclosure.

Figure 6:
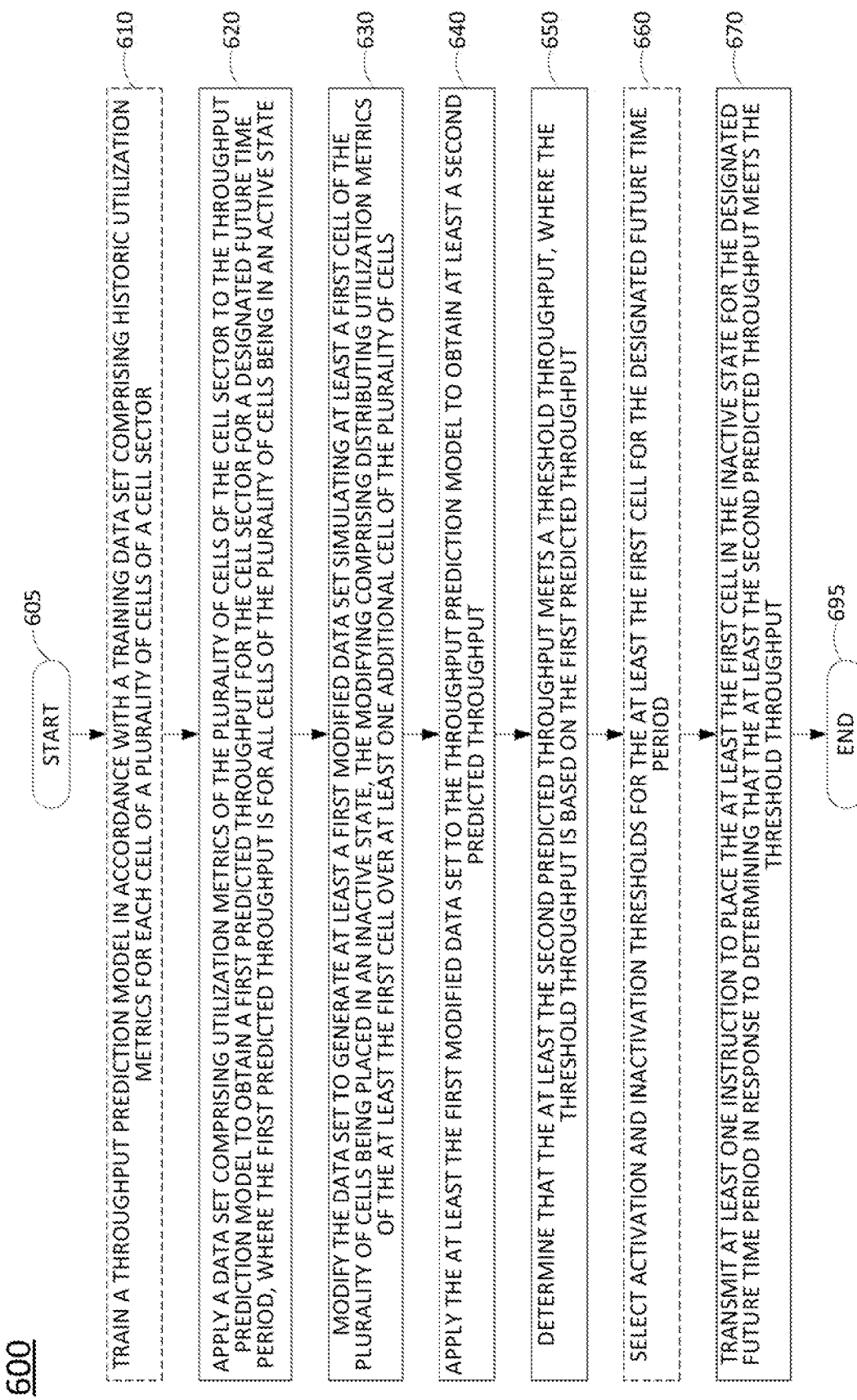
FIG. 6 illustrates a flowchart of an example method for transmitting an instruction to place at least a first cell in an inactive state at a future time period in response to determining via a throughput prediction model that a predicted throughput of a cell sector meets a threshold throughput when the at least the first cell is in the inactive state.

FIG. 6 illustrates, a flowchart of an example method 600 for transmitting an instruction to place at least a first cell in an inactive state at a future time period in response to determining via a throughput prediction model that a predicted throughput of a cell sector meets a threshold throughput when the at least the first cell is in the inactive state. In one example, steps, functions and/or operations of the method 600 may be performed by a device or system as illustrated in FIG. 1, such as server(s) 145 and/or SON/SDN controller 102, and/or any one or more components thereof, or server(s) 145 and/or SON/SDN controller 102, and/or any one or more components thereof in conjunction with one or more other components of the system 100, such as cell sites 111-113, BBU pool 114, MME 107, and so forth. In one example, the steps, functions, or operations of method 600 may be performed by a computing device or processing system, such as computing system 700, and/or a hardware processor element 702 as described in connection with FIG. 7 below. For instance, the computing system 700 may represent at least a portion of server, SON/SDN controller, or other device(s) in accordance with the present disclosure. In one example, the steps, functions, or operations of method 600 may be performed by a processing system comprising a plurality of such computing devices as represented by the computing system 700. For illustrative purposes, the method 600 is described in greater detail below in connection with an example performed by a processing system.

The method 600 begins in step 605 and may proceed to optional step 610 or to step 620.

At optional step 610, the processing system may train a throughput prediction model in accordance with a training data set. For instance, the throughput prediction model may comprise a machine learning model (e.g., a DNN) to predict/forecast a throughput of a cell site sector/coverage zone comprising a plurality of cells. In one example, the training data set may comprise historic utilization metrics for each cell of the plurality of cells. For instance, the historic utilization metrics may comprise, for each cell, at least: a number of endpoint devices attached to the network via the cell for each of a plurality of historic time periods (e.g., an number of endpoint devices with RRC connected states/statuses) and/or a physical resource block (PRB) utilization of the cell for each of the plurality of historic time periods. The throughput may comprise a measure of data quantity per unit of time (e.g., Mbps, or the like, such as Kbps, MB/s, etc.), and may be for user downlink (DL).

As noted above, training data may include entries extracted by taking rolling four week data sets as predictors, and the measured throughputs for designated time periods subsequent to the four weeks of each data set as the ground truth for the dependent variable (or for another such time window, such as three weeks, six weeks, etc.). In one example, the throughput prediction model may be trained exclusively on data from the cell site sector. In another example, the throughput prediction model may be trained based on data from the sector and/or "similar sectors" such as adjacent sectors, sectors being designated as similar by network personnel, such as sectors having similar urban, suburban, or rural deployments, sectors with the same number of cells and same network equipment for such cells, etc. In one example, training data can be sampled or can be over all historic data from a lookback time period, e.g., the last 3 months, the last 6 months, the last year, etc. In one example, the number of samples used for training (including validation and testing) may be increased until an accuracy the prediction/forecasting exceeds a threshold accuracy. In one example, a different type of model may be trained and deployed, such as a time-series forecasting/prediction model and/or a regression-based forecasting/prediction model (e.g., an LSTM model, or the like), and so forth.

At step 620, the processing system applies a data set comprising utilization metrics of a plurality of cells of a cell sector to the throughput prediction model to obtain a first predicted throughput for the cell sector for a designated future time period, where the first predicted throughput is for all cells of the plurality of cells being in an active state. For instance, the utilization metrics of the data set may include, for each cell of the plurality of cells: a number of endpoint devices attached to the network via the cell for at least a first time period (e.g., a number of unique endpoint devices in RRC connected state via the cell) and/or a PRB utilization of the cell for the at least the first time period. In one example, the at least the first time period may comprise a plurality of time periods, where the utilization metrics of the data set may include, for each cell of the plurality of cells: a number of endpoint devices attached to the network via the cell for each of the plurality of time periods including the at least the first time period and/or a PRB utilization of the cell for each of the plurality of time periods including the at least the first time period. As described above, the plurality of time periods may comprise different instances of a same time of day and day of week (e.g., 1:00 to 2:00 PM for four successive Thursdays, 9:15-9:30 PM for four successive Wednesdays, etc.). In one example, the utilization metrics may further include, for each cell of the plurality of cells, at least one of: a quantity of sleep time (e.g., an amount of time within the first time period that the cell is in an inactive state), a total number of PRBs configured for the cell, or a MAC layer data volume within the first time period for the cell. In one example, the utilization metrics may alternatively or additionally include cell peak and/or average spectral efficiency of the cell, energy efficiency of the cell, and so forth (e.g., also over the plurality of time periods).

At step 630, the processing system modifies the data set to generate at least a first modified data set simulating at least a first cell of the plurality of cells being placed in an inactive state. For instance, in one example, step 630 may comprise distributing utilization metrics of the at least the first cell over additional cells of the plurality of cells (i.e., over one or more other cells of the plurality of cells excluding at least the first cell) to generate the first modified data set. In accordance with the present disclosure, the plurality of cells may include at least one capacity cell and at least one coverage cell. As noted above, the at least one capacity cell may operate in a higher spectrum band as compared to the at least one coverage cell. In accordance with the present disclosure, the at least one capacity cell may be a candidate for being placed in an inactive state, while the at least one coverage cell may be omitted from consideration of being placed in an inactive state. For illustrative purposes, the at least the first cell may comprise a capacity cell (and hence is a candidate for being placed in an inactive state).

At step 640, the processing system applies the at least the first modified data set to the throughput prediction model to obtain at least a second predicted throughput. For instance, step 640 may comprise the same or similar operations as described above in connection with the sleep/wake configuration throughput forecasts 440 of FIG. 4.

At step 650, the processing system determines that the at least the second predicted throughput meets a threshold throughput (e.g., meets and/or exceeds the threshold throughput), where the threshold throughput is based on the first predicted throughput. For instance, a network operator may set an acceptable performance threshold at 99% of baseline throughput (e.g., 99% of the first predicted throughput), 98%, 95%, or the like. In one example, steps 640 and 650 may be repeated over a plurality of scenarios until an acceptable scenario is found that meets the threshold throughput. In one example, step 650 may also include verifying that the scenario (e.g., the at least the first cell of the plurality of cells being placed in an inactive state) satisfies one or more additional operational constraints, such as described above in connection with operational constrains 430 of FIG. 4.

At optional step 660, the processing system may select activation and inactivation thresholds for the at least the first cell for the designated future time period. For instance, the activation and inactivation thresholds may include: activation and inactivation thresholds for a number of attached endpoint devices for the at least the first cell in the designated future time period and/or activation and inactivation thresholds for a PRB utilization for the at least the first cell in the designated future time period. It should be noted that it may not be necessary to set thresholds for each cell, since coverage cells may have no thresholds (always active). However, in one example, optional step 660 may further include setting zero threshold(s) for a capacity cell that is designated for remaining active during the designated time period (e.g., a different capacity cell other than the at least the first cell). In one example, the selecting at optional step 660 may comprise the same or similar operations as described above in connection with the example of FIG. 5.

For instance, the selecting may comprise: determining an average number of attached endpoint devices for the sector over a plurality of time periods comprising a plurality of prior instances of a same time of day and day of week, selecting the activation threshold for the number of attached endpoint devices higher than the average number of attached endpoint devices and lower than a maximum combined capacity of attached endpoint devices for one or more active cells of the sector, and selecting the deactivation threshold lower than the activation threshold that is selected. In one example, the processing system may skip the determination of the average number, and can just select an offset from the maximum combined endpoint device connection capacity of the active cells. For instance, in one example, the activation threshold may be selected at a first offset with respect to the maximum combined capacity of attached endpoint devices for the one or more active cells of the sector, and the deactivation threshold may be selected at a second offset with respect to the activation threshold. In one example, the selection of the activation (wake) threshold and/or the deactivation (sleep) threshold may also take into account the average number of attached endpoint devices, e.g., selecting a midpoint between the average number and the maximum capacity of the one or more active cells. As noted above, the one or more active cells may comprise coverage cells that are not eligible to be inactivated (where the at least the first cell comprises a capacity cell). The one or more active cells may also include coverage cells that are designated to remain active in order to meet the throughput threshold for the cell in the designated time period.

In one example, optional step 660 may alternatively or additionally include: determining an average total PRB utilization for the sector over a plurality of time periods comprising a plurality of prior instances of a same time of day and day of week, selecting the activation threshold for the PRB utilization higher than the average total physical PRB and lower than a maximum combined PRB for one or more active cells of the sector, and selecting the deactivation threshold lower than the activation threshold that is selected. In one example, the processing system may skip the determination of the average number and can just select offset from maximum combined PRB capacity of the active cells.

In one example, activation thresholds may be based upon operational constraints, such as maximum number of connected endpoint devices for each cell, a maximum PRB utilization for each cell, etc. For instance, if coverage cell A can handle a maximum of 20 endpoint devices, and coverage cell B can handle a maximum of 18 endpoint devices, then an activation (wake) threshold for an inactive/sleeping capacity cell C can be set with respect to 38 (e.g., setting an activation threshold for at most 38 endpoint devices connected in the sector). Similarly, if the maximum number of connected endpoint devices at capacity cell C is 20, an activation threshold for a second inactive/sleeping capacity cell D can be set with respect to 58 connections at the sector. However, it should be noted that when at least one capacity cell is active, endpoint devices may preferentially be connected via such a capacity cell when available. For instance, coverage cell resources may be prioritized for endpoint devices that are in areas of weak signal, poor coverage, etc. As such, capacity cell D can be set to have a wake threshold with respect to the number of endpoint devices attached to capacity cell C (e.g., at most 20, in one example, could be 17, 18, or the like). In addition, for setting deactivation (sleep) thresholds, a hysteresis offset may be selected, e.g., 25 percent less than the wake threshold, 30 percent less than the wake threshold, etc. in terms of the number of connected endpoint devices and/or PRB utilization (or PRB utilization percentage). In one example, any sleep or wake threshold selected as described herein may be subject to maximum and minimum operational constraints, e.g., per equipment manufacturer(s) settings, per network operator global constraints, etc.

At step 670, the processing system transmits at least one instruction to place the at least the first cell in the inactive state for the designated future time period in response to determining that the at least the second predicted throughput meets the threshold throughput. In one example, each of the plurality of cells is associated with a set of network infrastructure for providing cellular communication services to respective endpoint devices in a respective cell of the plurality of cells. Thus, the at least the first cell may be associated with at least a first set of network infrastructure for providing cellular communication services to endpoint devices in the at least the first cell. Accordingly, the instruction may be transmitted to inactivate (e.g., to disable, turn off, put in sleep or standby mode, or the like) at least a portion of the at least the first set of network infrastructure. For example, the at least the first set of network infrastructure may comprise an antenna array, a feed network, a baseband unit, and so forth. For instance, the antenna array can be active array (e.g., with per-element phase shifters, mechanical tilt, etc.), the feed network can be active feed network (e.g., with power amplifiers, etc.), and so on. It should be noted that the at least the first cell may share one or more of these network infrastructure items with one or more other cells. As such, step 670 may comprise deactivating less than all of the associated network infrastructure items/network elements (e.g., deactivating a baseband unit, where an antenna array and feed network may continue to be powered for other cells that may share the array and/or feed network). In one example, the at least one instruction may further be to set activation and inactivation thresholds for the at least the first cell for the designated future time period, e.g., as selected per optional step 660 above.

Following step 670, the method 600 proceeds to step 695. At step 695, the method 600 ends.

It should be noted that the method 600 may be expanded to include additional steps, or may be modified to replace steps with different steps, to combine steps, to omit steps, to perform steps in a different order, and so forth. For instance, in one example the processing system may repeat one or more steps of the method 600, such as steps 630 and 640 with respect to different sleep/wake scenarios. For example, as noted above, different scenarios may be arranged in reverse order of a number of sleeping cells and may then be tested sequentially until a scenario is found that meets the threshold throughput based on the baseline throughput (e.g., the first predicted throughput). Alternatively, or in addition, steps 620-670 may be repeated with respect to the same sector for additional time periods, for different sectors of the same or a different cell site for a same time period, and so forth. In one example, the method 600 may further include calculating the threshold throughput based on the first predicted throughput.

In one example, at steps 630 and 640 the first modified data set may simulate the first cell and at least a second cell of the plurality of cells being placed in an inactive state. In addition, in such an example, the at least one instruction may be to place the first cell and the at least the second cell in inactive states in response to determining that the at least the second predicted throughput meets the threshold throughput. In one example, the first predicted throughput (e.g., the baseline throughput) may instead comprise an average of previous throughput measures for prior instance of a same time of day and day of week. In one example, the utilization metrics may omit either: metrics of a number of connected endpoint devices (e.g., a number of device in RRC connected state) or the PRB utilization metrics. In other words, one or the other may be used alone, or in conjunction with one or more other utilization metrics as predictors. In one example, the method 600 may be expanded or modified to include steps, functions, and/or operations, or other features described above in connection with the example(s) of FIGS. 1-5, or as described elsewhere herein. Furthermore, method 600 may further include the step of reactivating a sleeping cell when a wake up threshold is reached, i.e., transmitting at least a second instruction to place the first cell in an active state. Thus, these and other modifications are all contemplated within the scope of the present disclosure.

In addition, although not expressly specified above, one or more steps of the example method 600 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIG. 6 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 7 depicts a high-level block diagram of a computing system 700 (e.g., a computing device or processing system) specifically programmed to perform the functions described herein. For example, any one or more components or devices illustrated in FIG. 1 described in connection with the examples of FIGS. 2-6 may be implemented as the computing system 700. As depicted in FIG. 7, the computing system 700 comprises a hardware processor element 702 (e.g., comprising one or more hardware processors, which may include one or more microprocessor(s), one or more central processing units (CPUs), and/or the like, where hardware processor element may also represent one example of a "processing system" as referred to herein), a memory 704, (e.g., random access memory (RAM), read only memory (ROM), a disk drive, an optical drive, a magnetic drive, and/or a Universal Serial Bus (USB) drive), a module 705 for transmitting an instruction to place at least a first cell in an inactive state at a future time period in response to determining via a throughput prediction model that a predicted throughput of a cell sector meets a threshold throughput when the at least the first cell is in the inactive state, and various input/output devices 706, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 702 is shown, it should be noted that the computing device may employ a plurality of hardware processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor element 702 can also be configured or programmed to cause other devices to perform one or more operations as discussed above. In other words, the hardware processor element 702 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 705 for transmitting an instruction to place at least a first cell in an inactive state (or return it to an active state if a wake up threshold is reached) at a future time period in response to determining via a throughput prediction model that a predicted throughput of a cell sector meets a threshold throughput when the at least the first cell is in the inactive state (e.g., a software program comprising computer-executable instructions) can be loaded into memory 704 and executed by hardware processor element 702 to implement the steps, functions or operations as discussed above in connection with the example method 600. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 705 for transmitting an instruction to place at least a first cell in an inactive state at a future time period in response to determining via a throughput prediction model that a predicted throughput of a cell sector meets a threshold throughput when the at least the first cell is in the inactive state (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
    applying, by a processing system including at least one processor, a data set comprising utilization metrics of a plurality of cells of a cell sector to a throughput prediction model to obtain a first predicted throughput for the cell sector for a designated future time period, and wherein the first predicted throughput is for all cells of the plurality of cells being in an active state;
    modifying, by the processing system, the data set to generate at least a first modified data set simulating at least a first cell of the plurality of cells being placed in an inactive state, wherein the modifying comprises distributing utilization metrics of the at least the first cell over at least one additional cell of the plurality of cells;
    applying, by the processing system, the at least the first modified data set to the throughput prediction model to obtain at least a second predicted throughput;
    determining, by the processing system, that the at least the second predicted throughput meets a threshold throughput, wherein the threshold throughput is based on the first predicted throughput; and
    transmitting, by the processing system, at least one instruction to place the at least the first cell in the inactive state for the designated future time period in response to the determining that the at least the second predicted throughput meets the threshold throughput.

2. The method of claim 1, wherein the at least the first cell is associated with at least a first set of network infrastructure for providing a cellular communication service to endpoint devices in the at least the first cell.

3. The method of claim 2, wherein the at least one instruction is transmitted to inactivate at least a portion of the at least the first set of network infrastructure.

4. The method of claim 2, wherein the at least the first set of network infrastructure comprises at least one of:
    an antenna array;
    a feed network; or
    a baseband unit.

5. The method of claim 1, wherein the plurality of cells includes at least one capacity cell and at least one coverage cell.

6. The method of claim 5, wherein the at least one capacity cell operates in a higher spectrum band as compared to the at least one coverage cell.

7. The method of claim 5, wherein the at least the first cell is a capacity cell.

8. The method of claim 1, wherein the utilization metrics of the data set includes, for each cell of the plurality of cells:
    a number of endpoint devices attached to the network via the cell for at least a first time period; and
    a physical resource block utilization of the cell for the at least the first time period.

9. The method of claim 8, wherein the at least the first time period comprises a plurality of time periods, wherein the utilization metrics of the data set include, for each cell of the plurality of cells:
    a number of endpoint devices attached to a network via the cell for each of the plurality of time periods including the at least the first time period; and
    a physical resource block utilization of the cell for each of the plurality of time periods including the at least the first time period.

10. The method of claim 9, wherein the plurality of time periods comprises different instances of a same time of day and a same day of week.

11. The method of claim 8, wherein the utilization metrics further include, for each cell of the plurality of cells, at least one of:
   a quantity of sleep time comprising an amount of time within the first time period that the cell is in an inactive state;
   a total number of physical resource blocks configured for the cell; or
   a media access control layer data volume within the first time period for the cell.

12. The method of claim 1, wherein the throughput prediction model comprises a machine learning model, the method further comprising:
   training the throughput prediction model in accordance with a training data set, wherein the training data set comprises historic utilization metrics for each cell of the plurality of cells, wherein the historic utilization metrics comprise, for each cell, at least:
      a number of endpoint devices attached to a network via the cell for each of a plurality of historic time periods; and
      a physical resource block utilization of the cell for each of the plurality of historic time periods.

13. The method of claim 1, wherein the first modified data set simulates the first cell and at least a second cell of the plurality of cells being placed in an inactive state, and wherein the at least one instruction is to place the first cell and the at least the second cell in inactive states in response to determining that the at least the second predicted throughput meets the threshold throughput.

14. The method of claim 1, wherein the at least one instruction is further to set activation and inactivation thresholds for the at least the first cell for the designated future time period.

15. The method of claim 14, wherein the activation and inactivation thresholds include:
   activation and inactivation thresholds for a number of attached endpoint devices for the at least the first cell in the designated future time period; and
   activation and inactivation thresholds for a physical resource block utilization for the at least the first cell in the designated future time period.

16. The method of claim 15, further comprising:
   selecting the activation and inactivation thresholds for the at least the first cell for the designated future time period.

17. The method of claim 16, wherein the selecting comprises:
   determining an average of a number of attached endpoint devices for the cell sector over a plurality of time periods comprising a plurality of prior instances of a same time of day and a same day of week;
   selecting the activation threshold for the number of attached endpoint devices higher than the average of the number of attached endpoint devices and lower than a maximum combined capacity of attached endpoint devices for one or more active cells of the cell sector; and
   selecting the deactivation threshold lower than the activation threshold that is selected.

18. The method of claim 16, wherein the selecting comprises:
   determining an average total of a physical resource block utilization for the cell sector over a plurality of time periods comprising a plurality of prior instances of a same time of day and a same day of week;
   selecting the activation threshold for the physical resource block utilization higher than the average total of the physical resource block utilization and lower than a maximum combined physical resource block utilization for one or more active cells of the cell sector; and
   selecting the deactivation threshold lower than the activation threshold that is selected.

19. A non-transitory computer-readable medium storing instructions which, when executed by a processing system including at least one processor, cause the processing system to perform operations, the operations comprising:
   applying a data set comprising utilization metrics of a plurality of cells of a cell sector to a throughput prediction model to obtain a first predicted throughput for the cell sector for a designated future time period, and wherein the first predicted throughput is for all cells of the plurality of cells being in an active state;
   modifying the data set to generate at least a first modified data set simulating at least a first cell of the plurality of cells being placed in an inactive state, wherein the modifying comprises distributing utilization metrics of the at least the first cell over at least one additional cell of the plurality of cells;
   applying the at least the first modified data set to the throughput prediction model to obtain at least a second predicted throughput;
   determining that the at least the second predicted throughput meets a threshold throughput, wherein the threshold throughput is based on the first predicted throughput; and
   transmitting at least one instruction to place the at least the first cell in the inactive state for the designated future time period in response to the determining that the at least the second predicted throughput meets the threshold throughput.

20. An apparatus comprising:
   a processing system including at least one processor; and
   a computer-readable medium storing instructions which, when executed by the processing system, cause the processing system to perform operations, the operations comprising:
      applying a data set comprising utilization metrics of a plurality of cells of a cell sector to a throughput prediction model to obtain a first predicted throughput for the cell sector for a designated future time period, and wherein the first predicted throughput is for all cells of the plurality of cells being in an active state;
      modifying the data set to generate at least a first modified data set simulating at least a first cell of the plurality of cells being placed in an inactive state, wherein the modifying comprises distributing utilization metrics of the at least the first cell over at least one additional cell of the plurality of cells;
      applying the at least the first modified data set to the throughput prediction model to obtain at least a second predicted throughput;
      determining that the at least the second predicted throughput meets a threshold throughput, wherein the threshold throughput is based on the first predicted throughput; and
      transmitting at least one instruction to place the at least the first cell in the inactive state for the designated future time period in response to the determining that the at least the second predicted throughput meets the threshold throughput.

* * * * *